United States Patent
Lindström (10) Patent No.: US 9,605,599 B2
(45) Date of Patent: Mar. 28, 2017

(54) MAGNET HOLDER FOR USE IN A THROTTLE POSITION SENSOR, A MAGNET HOLDER FOR USE IN AN ANGULAR POSITION SENSOR, AND METHODS FOR MANUFACTURING THEM

(75) Inventor: Fredrik Lindström, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 308 days.

(21) Appl. No.: 14/237,595

(22) PCT Filed: Aug. 8, 2011

(86) PCT No.: PCT/SE2011/050982
§ 371 (c)(1),
(2), (4) Date: Feb. 7, 2014

(87) PCT Pub. No.: WO2013/022390
PCT Pub. Date: Feb. 14, 2013

(65) Prior Publication Data
US 2014/0183315 A1  Jul. 3, 2014

(51) Int. Cl.
*F02D 11/10* (2006.01)
*F02D 9/10* (2006.01)
(Continued)

(52) U.S. Cl.
CPC ........ *F02D 11/106* (2013.01); *B29C 45/0055* (2013.01); *F02D 9/105* (2013.01);
(Continued)

(58) Field of Classification Search
CPC ........ F02D 11/106; F02D 9/105; F02D 9/107; F16K 37/0041; F16K 37/0033; F16K 1/22;
(Continued)

(56) References Cited

U.S. PATENT DOCUMENTS 4,385,276 A  5/1983  Bitzel
5,208,532 A *  5/1993  Alfors ............... G01B 7/30
                                              123/617
(Continued)

FOREIGN PATENT DOCUMENTS

CN  101162155 A  4/2008
CN  102072697 A  5/2011
(Continued)

OTHER PUBLICATIONS

International Search Report and Written Opinion of PCT/SE2011/050982 mailed Apr. 27, 2012, all enclosed pages cited.
(Continued)

*Primary Examiner* — Joseph Dallo
(74) *Attorney, Agent, or Firm* — Nelson Mullins Riley & Scarborough LLP (57) ABSTRACT

A magnet holder (10) for use in an analogous or digital throttle position sensor for sensing the angle of a butterfly valve in a fuel supply unit of an internal combustion engine, said magnet holder (10) including a throttle lever member (11) adapted to be fixed to a shaft of the butterfly valve and carrying at least one magnet (17). A recess (12) for the magnet (17), or for each magnets if more than one magnet is used, is provided in the throttle lever member (11), the magnet (17) is located in said recess (12), or the magnets are located in said recesses if more than one magnet is used, and throttle lever member material (18) located around an entrance to the recess (12) or entrances to the recesses is staked over the magnet (17) or magnets, respectively, to cover each magnet (17) sufficiently to retain it in its associated recess (12). Thereby, the magnet/magnets (17) will be securely retained in the magnet holder (10) and the manufacturing of the holder can be done in production, particularly in large numbers such as mass production.

14 Claims, 4 Drawing Sheets

(51) Int. Cl.
*F16K 37/00* (2006.01)
*F16K 1/22* (2006.01)
*B29C 45/00* (2006.01)
*G01D 5/14* (2006.01)

(52) U.S. Cl.
CPC ............... *F02D 9/107* (2013.01); *F16K 1/22* (2013.01); *F16K 37/0033* (2013.01); *F16K 37/0041* (2013.01); *G01D 5/145* (2013.01); *Y10T 29/49826* (2015.01)

(58) Field of Classification Search
CPC ............... G01D 5/145; B29C 45/0055; Y10T 29/49826
USPC ....... 123/399; 73/114.36; 324/207.2, 207.21, 324/207.25, 251, 252
See application file for complete search history.

(56) References Cited

U.S. PATENT DOCUMENTS

| | | | | |
|---|---|---|---|---|
| 5,332,965 A * | 7/1994 | Wolf | ........................ | G01D 3/02 324/202 |
| 5,444,369 A * | 8/1995 | Luetzow | ................... | G01B 7/30 123/376 |
| 5,497,081 A * | 3/1996 | Wolf | ........................ | G01D 3/02 324/207.12 |
| 5,694,039 A * | 12/1997 | Alfors | ...................... | G01B 7/30 324/207.12 |
| 5,757,179 A * | 5/1998 | McCurley | .............. | G01D 5/145 123/617 |
| 5,757,181 A * | 5/1998 | Wolf | ..................... | F02D 11/106 324/207.12 |
| 5,798,639 A * | 8/1998 | McCurley | .............. | G01D 5/145 123/617 |
| 5,996,554 A * | 12/1999 | Tojo | ........................ | H02K 26/00 123/399 |
| 6,067,961 A * | 5/2000 | Kato | ........................ | F02D 9/106 123/399 |
| 6,198,275 B1 * | 3/2001 | Wolf | ..................... | F02D 11/106 324/207.12 |
| 6,522,038 B2 | 2/2003 | Byram | | |
| 6,646,435 B1 * | 11/2003 | Nakamura | ............ | F02D 11/106 324/207.12 |
| 6,703,827 B1 * | 3/2004 | Wolf | ...................... | G01D 3/022 324/207.12 |
| 6,763,850 B1 * | 7/2004 | Jansen | ................... | F02D 9/105 137/553 |
| 7,032,617 B2 | 4/2006 | Kurita et al. | | |
| 7,036,791 B2 | 5/2006 | Wiese | | |
| 7,111,602 B2 | 9/2006 | Sturdy et al. | | |
| 7,210,451 B2 | 5/2007 | Ikeda et al. | | |
| 7,275,517 B2 * | 10/2007 | Kurita | ..................... | G01D 5/145 123/337 |
| 7,400,139 B2 * | 7/2008 | Spellman | ............... | G01D 5/147 324/207.2 |
| 7,845,616 B2 | 12/2010 | Hatsuzawa et al. | | |
| 7,986,139 B2 * | 7/2011 | Goto | ..................... | G01D 5/2013 324/207.16 |
| 8,522,607 B2 * | 9/2013 | Grossmann | ................ | 73/114.36 |
| 8,635,986 B2 | 1/2014 | Ikeda et al. | | |
| 2001/0026153 A1 * | 10/2001 | Nakamura | ............. | G01D 5/145 324/207.2 |
| 2002/0179825 A1 * | 12/2002 | Lin | ....................... | G01D 5/145 250/231.14 |
| 2004/0017186 A1 * | 1/2004 | Viola | ..................... | G01D 5/145 324/207.2 |
| 2004/0196030 A1 * | 10/2004 | Moreno | ................. | G01D 5/145 324/207.25 |
| 2004/0257067 A1 * | 12/2004 | Mattson | ................. | G01D 5/145 324/207.2 |
| 2005/0104581 A1 * | 5/2005 | Miyata | .................. | F02D 11/106 324/207.25 |
| 2005/0127900 A1 * | 6/2005 | Johnson | ................. | G01D 5/145 324/207.2 |
| 2005/0183695 A1 * | 8/2005 | Keefover | .............. | F02D 9/1065 123/399 |
| 2006/0016427 A1 * | 1/2006 | Uda | ...................... | F02D 9/1095 123/399 |
| 2007/0000455 A1 * | 1/2007 | Akiyama | .............. | F02D 11/106 123/19 |
| 2007/0068491 A1 * | 3/2007 | Kurita | ................... | G01D 5/145 123/399 |
| 2007/0080679 A1 * | 4/2007 | Frank | ..................... | G01D 5/145 324/207.25 |
| 2007/0247143 A1 | 10/2007 | Ikeda et al. | | |
| 2008/0218158 A1 | 9/2008 | Carlson et al. | | |
| 2008/0272660 A1 | 11/2008 | Becker et al. | | |
| 2008/0296804 A1 | 12/2008 | Colli et al. | | |
| 2009/0140730 A1 | 6/2009 | Newman et al. | | |
| 2010/0071450 A1 * | 3/2010 | Tanaka | ................... | B62K 23/04 73/114.36 |
| 2010/0207616 A1 | 8/2010 | Wolschlager et al. | | |
| 2011/0056460 A1 | 3/2011 | Kondo et al. | | |

FOREIGN PATENT DOCUMENTS

| | | |
|---|---|---|
| EP | 1475525 A2 | 11/2004 |
| EP | 1517149 A2 | 3/2005 |
| EP | 1712926 A1 | 10/2006 |
| EP | 1739295 A2 | 1/2007 |
| EP | 2290217 A2 | 3/2011 |

OTHER PUBLICATIONS

Chapter I International Preliminary Report on Patentability of PCT/SE2011/050982 mailed Feb. 11, 2014, all enclosed pages cited.

* cited by examiner

MAGNET HOLDER FOR USE IN A THROTTLE POSITION SENSOR, A MAGNET HOLDER FOR USE IN AN ANGULAR POSITION SENSOR, AND METHODS FOR MANUFACTURING THEM

TECHNICAL FIELD

The present invention relates to a method of manufacturing a magnet holder in an analogous or digital throttle position sensor for sensing the angle of a butterfly valve in a fuel supply unit of an internal combustion engine, comprising:

a) making a throttle lever member adapted to be fixed to a shaft of the butterfly valve; and b) attaching at least one magnet to the throttle lever member.

It also relates to a magnet holder for use in an analogous or digital throttle position sensor for sensing the angle of a butterfly valve in a fuel supply unit of an internal combustion engine, said magnet holder including a throttle lever member adapted to be fixed to a shaft of the butterfly valve and carrying at least one magnet.

It further relates to a method of manufacturing a magnet holder for an angular position sensor, comprising:

a) making a rotation member of the angular position sensor which rotation member is configured to be fixed to a shaft and adapted for rotation together with said shaft;

b) attaching at least one magnet to the rotation member;

It also relates to a magnet holder for use in an angular position sensor, said angular position sensor including a rotation member adapted to be fixed to a shaft and configured to rotate therewith, and the rotation member being configured to carry at least one magnet.

BACKGROUND ART

Such a method and such a magnet holder are described in EP 2 290 217 A2. A fuel supply unit, such as a carburetor or a low pressure injection system of an internal combustion engine, includes a main body having a main air passage, which has a throttle valve mounted therein and the throttle valve includes a throttle shaft extending between two oppositely located shaft sides of the main body. A control module for the fuel supply is mounted to one of the shaft sides, which control module includes throttle position detecting means for monitoring the position of the throttle valve, and fuel valve means for controlling the fuel supply to the main air passage. The throttle position detecting means include at least one magnet or similar magnetic flux generating means, which may be mounted on a disk-shaped carrier fixed to the throttle shaft to rotate therewith, and at least one analogous Hall effect sensor or similar magnetic flux density sensing element, which may be fixed in relation to the main body of the fuel supply unit. The Hall sensor generates an output voltage that is approximately linear in relation to the size of rotation of the throttle shaft and the butterfly valve. Thus, an accurate value of the position of the throttle valve can be derived within the part throttle range. The problem of fixing the magnet or magnets reliably to the carrier is not discussed.

Several suggestions relating to the use of magnets for obtaining information about the position of the butterfly valve in a carburetor are published. U.S. Pat. No. 6,522,038 B2 discloses position sensing magnets that are fixedly mounted circumferentially about an outer surface of output shaft and extend beyond the end of output shaft to define a recess bounded circumferentially by position sensing magnets and by an end surface of output shaft at one end of the recess.

U.S. Pat. No. 7,032,617 B2 discloses an intake air control apparatus for an engine is capable of suppressing the influence of external magnetic flux from outside thereby to prevent a variation in an output of a rotational angle detection sensor due to the external magnetic flux. A permanent magnet is provided on an end portion of a shaft. A rotational angle detection sensor is disposed in a spaced parallel relation with respect to the permanent magnet, and has a magneto resistive element for detecting a change in direction of a magnetic flux of the permanent magnet thereby to detect a rotational angle of a throttle valve. A bypass member is disposed to enclose the rotational angle detection sensor with its side near the permanent magnet apertured to form an opening surface, the bypass member being made of a magnetic material which is adapted to form a bypass path for the magnetic flux from the permanent magnet. The magnet is located in a recess, but there is nothing retaining it securely in the recess.

U.S. Pat. No. 7,036,791 B2 discloses a position detection device that comprises a magnet, which is arranged at a first end of the butterfly valve shaft. The magnet is diametrically magnetized and embodied in one piece as a ring. A sensor is arranged aligned with the axis of rotation of the butterfly valve shaft, in the centre of the ring.

U.S. Pat. No. 7,111,602 B2 discloses an actuator for an intake manifold tuning valve to regulate airflow in an intake manifold of an internal combustion engine. The actuator includes a motor, control circuit, and sensor all mounted in a housing that has an opening through which an output shaft extends. The output shaft carries a driven gear for rotation of the output shaft, and a valve blade that is positioned within the intake manifold when the actuator is assembled in place. The sensor provides the control circuit with feedback data indicating the position of the valve blade and this data permits the actuator itself to provide closed loop control of the position of the valve blade using an actuator command received from the engine's electronic control unit. The driven gear has a side with a generally arcuate magnet attached thereto. The magnet is used in conjunction with the position sensor and is attached to the gear by a plurality of plastic fingers extending transversely from the side of the driven gear for receipt in through openings in a surface of the magnet. The fingers are heat staked to retain the magnet to the side of the driven gear, but the magnet is not located in a protective recess.

U.S. Pat. No. 7,210,451 B2 discloses a throttle control device that includes a motor coupled to the throttle shaft, so that the throttle valve rotates to open and close an intake air channel as the motor is driven. A detection device serves to detect the degree of opening of the throttle valve and includes a pair of arcuate magnets and a sensor. The magnets are mounted to the throttle shaft via a magnet support and are positioned to oppose each other across the rotational axis of the throttle shaft in order to produce a uniform magnetic field. The sensor is mounted to the throttle body and serves to detect a direction of the magnetic field produced by the magnets, so that the detection device outputs a signal representing the degree of opening of the throttle valve. A throttle gear has a substantially cylindrical tubular portion that is positioned to extend outward of an end surface of the throttle shaft. The tubular portion is coaxial with the throttle shaft. A yoke is formed integrally with the inner peripheral surface of the tubular portion through an insertion molding process of the tubular portion. The yoke is made of magnetic material and has a ring-shaped configuration substantially about the rotational axis of the throttle shaft. A pair of magnets and (permanent magnets) is attached to the inner peripheral surface of the yoke. The magnets are positioned to symmetrically oppose each other with respect to the rotational axis of the throttle shaft.

US 2008/0296804 A1 discloses a method of manufacturing a shaft provided with a magnet for an air flow rate adjustment valve in an internal combustion engine. The method comprises the steps of: arranging a first mold which negatively reproduces the shape of the shaft and determines the formation of a seat for the magnet; injecting a molten plastic material inside the mold in order to form the shaft provided with the seat for the magnet by injection molding; arranging a second mold which surrounds the seat for the magnet; and injecting a molten magnetic polymer in the second mold for forming the magnet by injection molding. Thus, the magnet is circular and located in a recess that is coaxial with the shaft, but there is nothing retaining it securely in the recess.

Snap-in fastening has previously been used for securing magnets in carriers but has proved to be less robust than necessary and, in addition, gluing had to be used. This is an inappropriate method for production, particularly in large numbers such as mass production. The magnets have to be secured in a way that is suitable in such production.

SUMMARY OF THE INVENTION

It is an object of the present invention to provide a magnet holder that is suitable for production, particularly in large numbers such as mass production, and will retain the magnets securely and a method of manufacturing it.

In a method of the kind referred to in the first paragraph above, this object is achieved in accordance with a preferred embodiment of the present invention by:

c) prior to step b), providing a recess in the throttle lever member for the magnet or for each magnet if more than one magnet is used;

d) then inserting the magnet into the recess or the magnets into the recesses if more than one magnet is used; and e) attaching the magnet or magnets by staking the throttle lever member material located around an entrance to its associated recess or entrances to their associated recesses to cover each magnet sufficiently to retain it in its associated recess.

Similarly, in a magnet holder of the kind referred to in the second paragraph above, this object is achieved in accordance with a preferred embodiment of the present invention in that a recess for the magnet, or for each magnets if more than one magnet is used, is provided in the throttle lever member, the magnet is located in said recess, or the magnets are located in said recesses if more than one magnet is used, and throttle lever member material located around en entrance to the recess or entrances to the recesses is staked over the magnet or magnets, respectively, to cover each magnet sufficiently to retain it in its associated recess.

Similarly, in a method of the kind as referred to in the third paragraph above, this object is achieved by:

c) prior to step b), providing a recess in the rotation member for the magnet or for each magnet if more than one magnet is used;

d) then inserting the magnet into the recess or the magnets into the recesses if more than one magnet is used; and e) securing the magnet or magnets by applying a heated tool to the material of the rotation member located around an entrance to its associated recess or entrances to their associated recesses to cover each magnet sufficiently to retain it in its associated recess.

Similarly, in a magnet holder of the kind referred to in the fourth paragraph above, this object is achieved in accordance with an embodiment of the present invention in that a recess for the magnet, or for each magnets if more than one magnet is used, is provided in the rotation member, the magnet is located in said recess, or the magnets are located in said recesses if more than one magnet is used, and rotation member material located around an entrance to the recess or entrances to the recesses is staked over the magnet or magnets, respectively, to cover each magnet sufficiently to retain it in its associated recess.

Thereby, the magnet holder is suitable for production, particularly in large numbers such as mass production, and will retain the magnet or magnets securely.

Preferably, the throttle lever member is made by injection molding and has three parallel tubular members interconnected by an integral transverse connection. Two of them are equidistantly spaced from the third one and have bottoms and constitute the two recesses, the third one is larger and adapted to receive the shaft of the butterfly valve. Alternatively, the throttle lever member is made by injection molding and has two interconnected tubular members spaced from each other. One of them has a bottom and constitutes the recess, the other one is larger and adapted to receive the shaft of the butterfly valve. Such a throttle lever member is well adapted for production, particularly in large numbers such as mass production.

To get an accurate value of the position of the throttle valve, the magnet or magnets are suitably arranged with a radius and angle that is adapted to the movement of the butterfly valve and location of the magnetic sensor as well as towards the other magnet or magnets if more than one magnet is being used in the throttle position sensor. When two magnets are used, they suitably are separated a rotational angle on the order of 90° from each other. Also other placements are possible.

The throttle lever member may be made of a suitable lightweight alloy, as well as metal in any form such as cast or sheet metal, but for manufacturing reasons it is suitably made of a thermoplastic resin material.

The staking may be carried out in several ways, but suitably it involves application of heat or ultrasonic vibration to soften the material. In some cases it is even preferred to melt the material. To protect the magnets during use of the magnet holder, it is even preferred that after the staking, the magnets are completely embedded in the material of the throttle lever member.

BRIEF DESCRIPTION OF THE DRAWINGS

In the following, the invention will be described in more detail with reference to preferred embodiments and the appended drawings.

FIG. 9b is a cross sectional view of the throttle lever member of FIG. 9a.

FIG. 10b is a cross sectional view of the throttle lever member of FIG. 10a.

FIG. 11b is a cross sectional view of the throttle lever member of FIG. 11a.

FIG. 12b is a schematic cross sectional view of another example of a tool 20 for staking with a conically shaped tip recess 22, the tip recess 22 being larger than that in FIG. 12a.

MODE(S) FOR CARRYING OUT THE INVENTION

Figure 1:
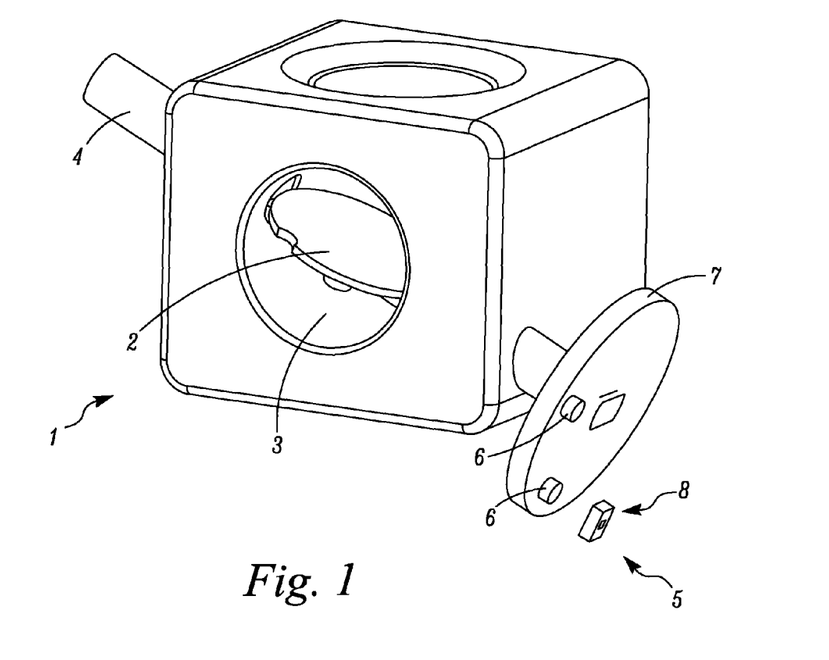
FIG. 1 is a schematic perspective view of a main body of a fuel supply unit having a main air passage with a throttle valve including a throttle shaft and provided with a prior art throttle position sensor.

FIG. 1 shows a fuel supply unit, such as a carburetor or a low pressure injection system of an internal combustion engine. The schematically shown fuel supply unit includes a main body 1 having a main air passage 2, which has a throttle valve 3 of butterfly type mounted therein, and the throttle valve 3 includes a throttle shaft 4 extending between two oppositely located shaft sides of the main body 1. A control module (not shown) for the fuel supply is mounted to one of the shaft sides, which control module includes throttle position detecting means 5 for monitoring the position of the throttle valve 3, and fuel valve means (not shown) for controlling the fuel supply to the main air passage 2. The throttle position detecting means 5 include at least one magnet 6 or similar magnetic flux generating means, which in the prior art embodiment shown in FIG. 1 is mounted on a disk-shaped carrier 7 fixed to the throttle shaft 4 to rotate therewith, and at least one analogous or digital Hall effect sensor 8 or similar magnetic flux density sensing element, which is fixed in relation to the main body 1 of the fuel supply unit. The Hall effect sensor 8 generates an output voltage that is approximately linear in relation to the size of rotation of the throttle shaft 4 and the butterfly valve 3. Thus, an accurate value of the position of the throttle valve 3 can be derived within the part throttle range. The output signal of said Hall effect sensor can also be non-linear as well as a digital output from a digital Hall effect sensor.

Figure 2:
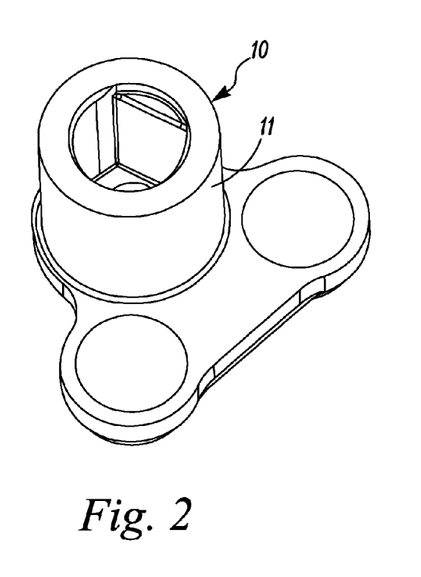
FIG. 2 is a perspective view of a throttle lever member in which two magnets are secured in accordance with a preferred embodiment of the present invention.

To provide a magnet holder that is suitable for production, particularly in large numbers such as mass production, and will retain the magnets securely, the magnet holder 10 shown in FIG. 2 is developed for use in place of the disk-shaped carrier 7 with magnets 6 in FIG. 1. The magnet holder 10 includes a throttle lever member 11 having at least one recess 12 for receiving a permanent magnet. When a single magnet is used, it is long and arcuate, but in the preferred shown embodiment, two recesses for two magnets are provided. Naturally, if desired, it is possible to provide more than two magnets. To secure the magnet in its recess, the throttle lever member material located around the entrance of its associated recess is staked to cover the magnet sufficiently to retain it in its associated recess. In FIG. 2 the magnets are not shown, because they are covered by staked material. Further, the two magnets suitably are separated a rotational angle on the order of 90° from each other. To get an accurate value of the position of the throttle valve, the magnet or magnets are suitably arranged with a radius and angle that is adapted to the movement of the butterfly valve and location of the magnetic sensor as well as towards the other magnet or magnets if more than one magnet is being used in the throttle position sensor.

Figure 3:
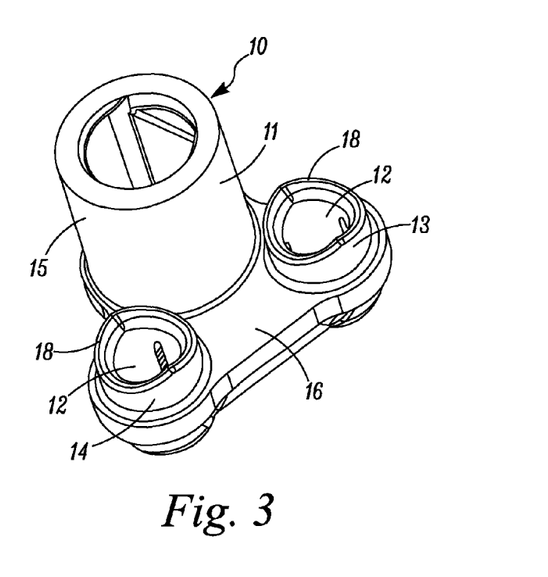
FIG. 3 is a similar perspective view showing the throttle lever member of FIG. 2 before the incorporation of the magnets therein.
Figure 4:
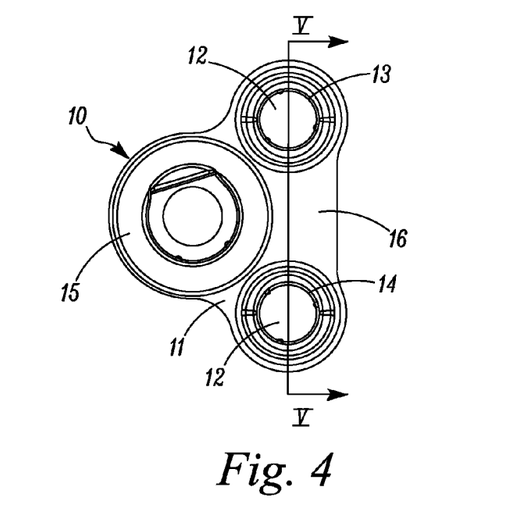
FIG. 4 is a top view of the throttle lever member of FIG. 3.
Figure 5:
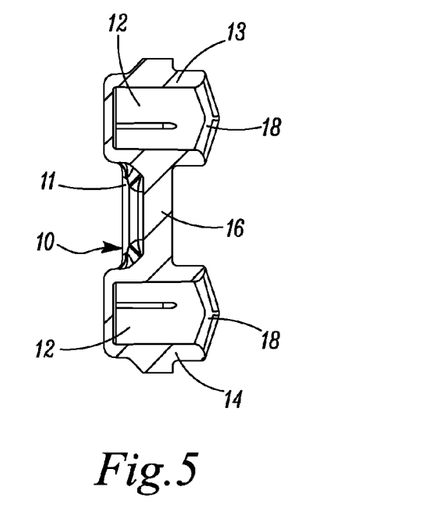
FIG. 5 is a cross-sectional view taken along line V-V in FIG. 4 showing the empty recesses for receipt of the magnets.

FIGS. 3-5 show the throttle lever member 11 before the insertion of the magnets in the recesses 12. The throttle lever member 11 is designed to be manufactured by injection molding. The material used may be a light metal alloy, as well as metal in any form such as cast or sheet metal, but suitably a thermoplastic resin is used. The thermoplastic resin preferably is a polyoxymethylene (POM), which has high stiffness, low friction and excellent dimensional stability. The throttle lever member 11 has three parallel tubular members 13-15 interconnected by an integral transverse connection 16. Two of them 13, 14 are equidistantly spaced from the third one 15 and have bottoms (FIG. 5) and constitute the two recesses 12. The third one 15 is larger both regarding length and diameter, and it is adapted to receive the shaft of the butterfly valve.

Figure 6:
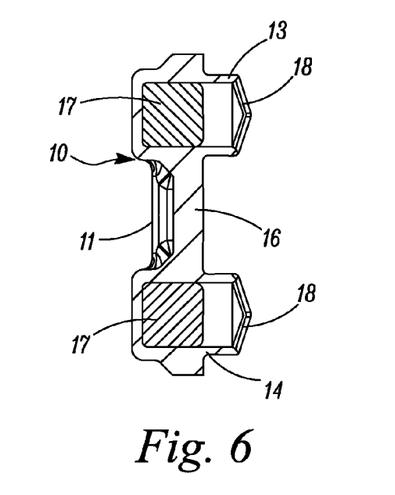
FIG. 6 is a cross-sectional view similar to FIG. 5 but showing the recesses after insertion of the magnets.
Figure 7:
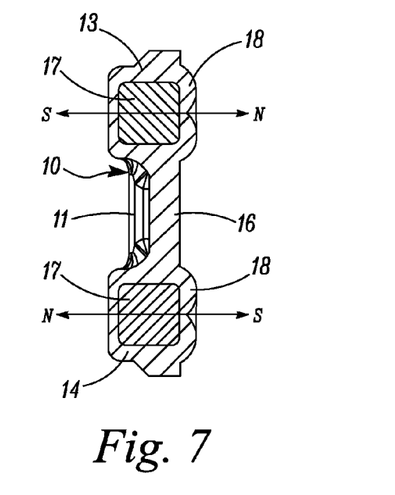
FIG. 7 is a cross-sectional view similar to FIGS. 5 and 6 but showing the result after material around the entrance of each recess has been staked down over the magnets to secure them in the recesses.
Figure 8:
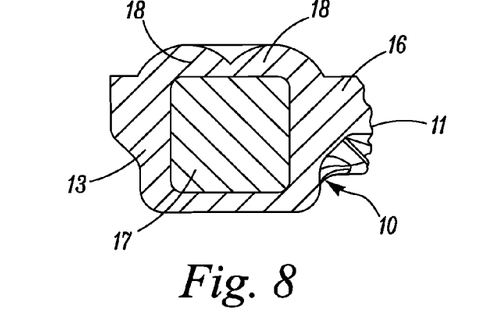
FIG. 8 is a view showing a part of FIG. 7 on a larger scale.

In FIG. 6 the magnets 17 are shown inserted to the bottom of the recesses 12. The magnets are cylinders of a length that may be substantially equal to the diameter of the cylinder, preferably on the order of 3 mm, but other arrangements with other lengths than the diameter and also other diameters are possible for the magnets. FIG. 6 also shows that the recesses 12 are deeper than the length of the cylindrical magnets 17, so that the throttle lever member material 18 located around the entrance of the recess 12 can be staked to cover the magnet 17 sufficiently to retain it in its associated recess 12. Preferably, the material 18 for staking is available in such an amount at the entrance of the recess 12, that the magnet 17 will be completely covered by the staked material, so that as shown in FIGS. 7 and 8 the magnet 17 after the staking operation is completely embedded in the material 18 of the throttle lever member 11. The staking preferably is thermoplastic staking and involves application of heat or ultrasonic vibration to soften the material 18. If desired, it is possible to apply so much energy that the material 18 melts and flows out over the exposed surface of the magnet 17 to cover it.

FIG. 7 also shows that the two magnets 17 are polarized in opposite direction in relation to each other, so as to form a magnetic flux density through the Hall element of the Hall effect device that is substantially proportional to the size of rotation of the magnet holder 10 and the throttle shaft. Consequently, the analogous or digital Hall sensor generates an output voltage that is approximately linear in relation to size of rotation of the throttle shaft and the throttle valve. With this kind of Hall effect device, an accurate value of the position of the throttle valve can be derived also within the part throttle range.

Figure 9A:
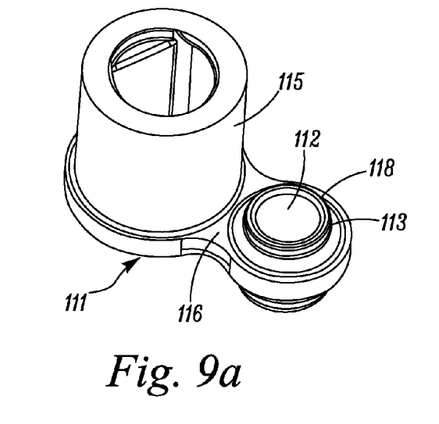
FIG. 9a is a perspective view of a first alternative embodiment of the throttle lever member before the incorporation of the magnet therein.
Figure 9B:
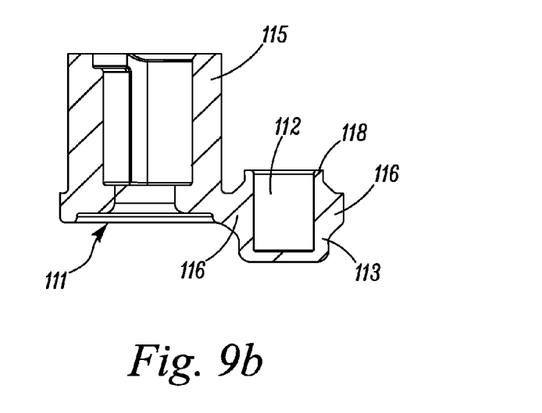

FIGS. 9a and 9b show a first alternative embodiment of the throttle lever member 111 before the insertion of the magnet in the recess 112. Similarly to what is described above, the throttle lever member 111 is designed to be manufactured by injection molding. The material used may be a light metal alloy, as well as metal in any form such as cast or sheet metal, but suitably a thermoplastic resin, preferably a polyoxymethylene (POM) is used. The throttle lever member 111 two parallel tubular members 113, 115 spaced from each other and interconnected by an integral transverse connection 116. One of them 113 has a bottom (FIG. 9b) and constitutes the recess 112. The other one 115 is larger both regarding length and diameter, and it is adapted to receive the shaft of the butterfly valve. As above, the recess 112 is deeper than the length of the magnet to be inserted in the recess, so that the material 118 located around the entrance of the recess 112 can be staked to cover the magnet sufficiently to retain it in its associated recess 112.

Figure 10A:
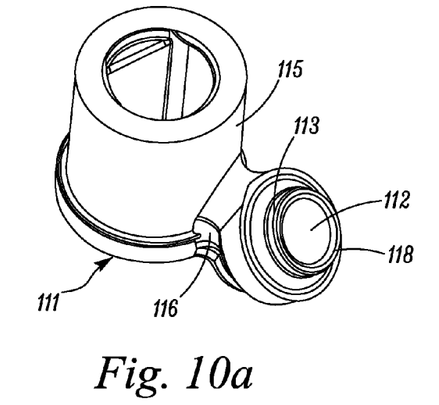
FIG. 10a is a perspective view of a second alternative embodiment of the throttle lever member before the incorporation of the magnet therein.
Figure 10B:
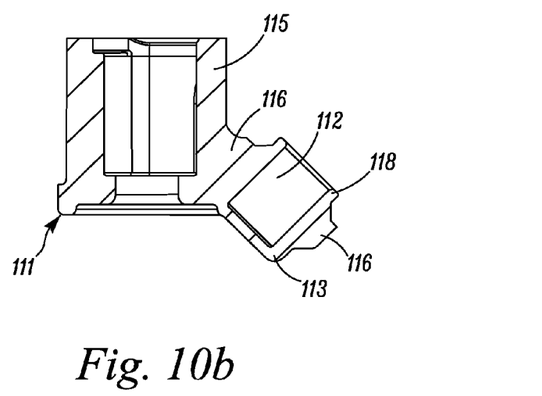
Figure 11A:
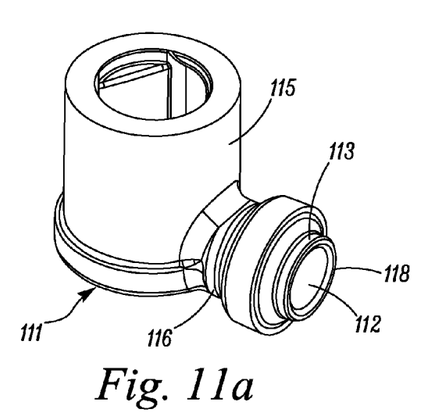
FIG. 11a is a perspective view of a third alternative embodiment of the throttle lever member before the incorporation of the magnet therein.
Figure 11B:
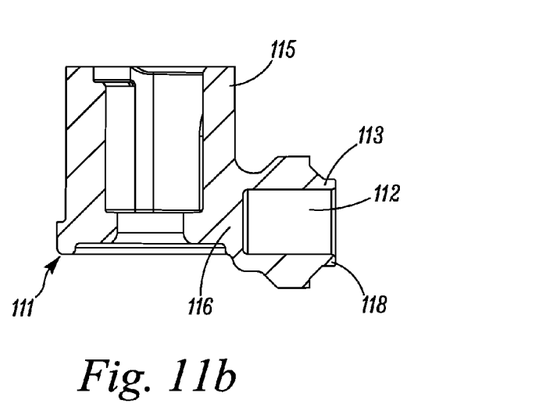

The two tubular members do not have to be parallel but can form any angle with each other. In the embodiment shown in FIGS. 10a and 10b, the angle is 45° and in the one of FIGS. 11a and 11b it is 90°, for example. When two magnets are used, the two tubular members for receiving the magnets instead of being parallel to the third tubular member, which is adapted to receive the throttle shaft, may extend radially outward and form any desired angle with the third tubular member. The orientation and placement of the magnet or magnets to a large degree is dependent on where to optimally place the Hall effect sensor.

The manufacturing of the throttle lever member 11, the insertion of the magnets 17 into the recesses 12, and the thermoplastic staking of throttle lever member material 18 around the entrance of the recesses 12 to cover each magnet 17 sufficiently to retain it in its associated recess 12 can be done in production, particularly in large numbers such as mass production. Thus, by using the method of the present invention, the magnet holder 10 of the present invention can be produced at low cost.

It is appreciated that the magnet holder 10 is not limited for use in throttle position sensors, but may be used in any angular position sensor having a rotation member 11 carrying at least one magnet. In such other angular position sensors the rotation member 11 preferably is equivalent with the throttle lever member 11. Applications for said other angular position sensors may be sensing the position, or degree of opening, of other valves than the throttle valve, e.g. a choke valve. Yet other applications may be equipment used for calibration, accurate measuring or testing, etc.

Thus, the present invention provides a method of manufacturing a magnet holder 10 for an angular position sensor, comprising:
a) making a rotation member 11 of the angular position sensor which rotation member 11 is configured to be fixed to a shaft and adapted for rotation together with said shaft;
b) attaching at least one magnet 17 to the rotation member 11;
c) prior to step b), providing a recess 12 in the rotation member 11 for the magnet 17 or for each magnet if more than one magnet is used;

d) then inserting the magnet 17 into the recess 12 or the magnets into the recesses if more than one magnet is used; and
e) securing the magnet 17 or magnets by applying a heated tool 20 to the material 18 of the rotation member 11 located around an entrance to its associated recess 12 or entrances to their associated recesses to cover each magnet 17 sufficiently to retain it in its associated recess 12.

Figure 12A:
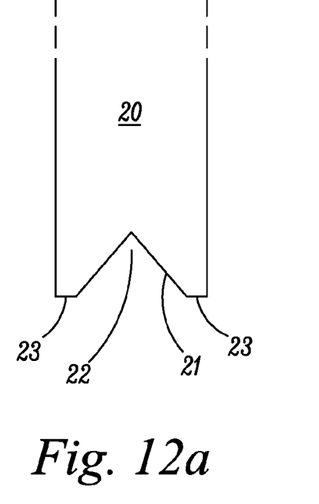
FIG. 12a is a schematic cross sectional view of an example of a tool 20 for staking with a conically shaped tip recess 22.
Figure 12B:
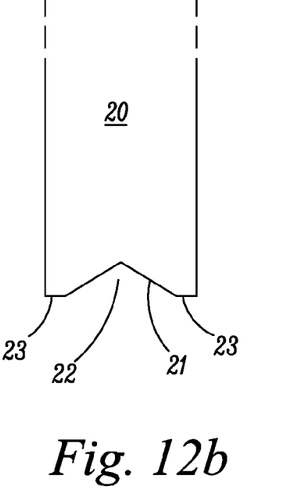
Figure 12C:
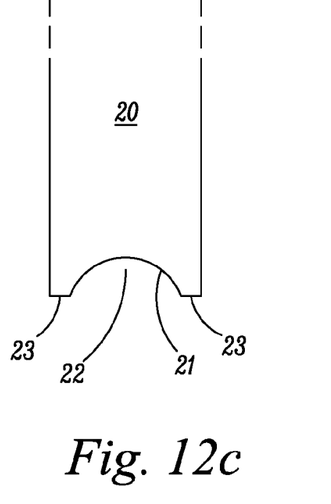
FIG. 12c is a schematic cross sectional view of an example of a tool 20 for staking with a tip recess 22 having a shape like a part of a sphere.
Figure 12D:
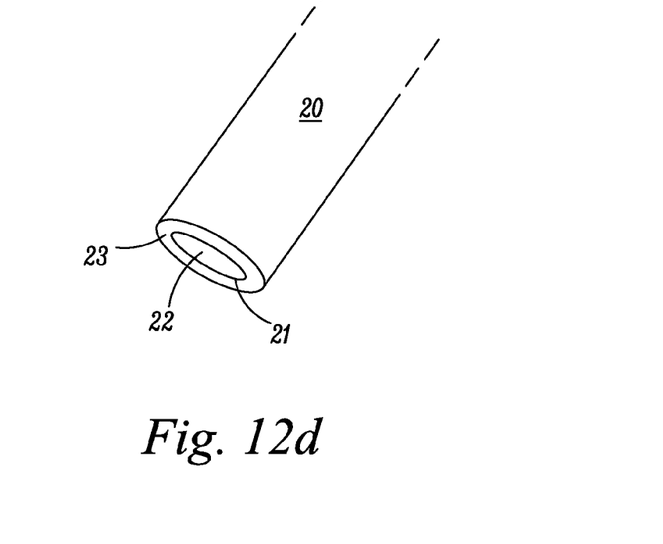
FIG. 12d is a schematic perspective view of an example of a tool 20 for staking having a tip recess 22.

Suitably, the tool 20, which is preferably a thermal probe, has a tip portion 21 that comprises a tip recess 22 which is recessed with respect to the surrounding surfaces 23 of the tip portion 21, and step e) comprises pressing the tip portion 21 against the material 18 of the rotation member 11 located around an entrance to its associated recess 12 or entrances to their associated recesses. Preferably, the tip recess 22 has a conical shape as in FIGS. 12a and 12b. Of course, the relative dimensions of the conical shape may vary. Also, the shape of the tip recess may have various other shapes such as part of a sphere, as is illustrated in FIG. 12c. The tip recess 22 facilitates guiding of the material 18 when applying, preferably pressing by an automated machine, the tool 20 against the rotation member material 18 such that the material 18 is forced or guided radially inwards to cover at least a portion of the magnet 17. Further, the tip portion 21 has a temperature greater than the melting point of the material 18 of the rotation member 11 when applied to the material 18. FIG. 12d illustrates the tool 20 in perspective view which tool 20 has a recess with a circularly shaped periphery in a plane parallel with the surrounding surface of the tip 21 of the tool 20.

According to an embodiment of the present invention a magnet holder 10 for use in an angular position sensor is provided, said magnet holder 10 including a rotation member 11 which is adapted to be fixed to a shaft and configured to rotate therewith and carry at least one magnet 17. Further, a recess 12 for the magnet 17, or for each magnets if more than one magnet is used, is provided in the rotation member 11, the magnet 17 is located in said recess 12, or the magnets are located in said recesses if more than one magnet is used, and rotation member material 18 located around an entrance to the recess 12 or entrances to the recesses is staked over the magnet 17 or magnets, respectively, to cover each magnet 17 sufficiently to retain it in its associated recess 12.

INDUSTRIAL APPLICABILITY

The present invention is applicable for production, particularly in large numbers such as mass production, of a magnet holder for use in a throttle position monitoring system in a fuel supply unit of an internal combustion engine.

The invention claimed is:
1. A method of manufacturing a magnet holder in an analogous or digital throttle position sensor for sensing the angle of a butterfly valve in a fuel supply unit of an internal combustion engine, comprising:
a) making a throttle lever member adapted to be fixed to a shaft of the butterfly valve by injection molding, said throttle lever member having three parallel tubular members interconnected by an integral transverse connection, two of the parallel tubular members being equidistantly spaced from a third one of the parallel tubular members and having bottoms and constituting two recesses, each recess adapted to receive a magnet, and wherein the third one of the parallel tubular mem- bers is larger than the other two parallel tubular members and is adapted to receive the shaft of the butterfly valve;
b) attaching at least two magnets to the throttle lever member;
c) then inserting the magnets into the recesses; and
d) retaining the at least two magnets in the recesses by staking the throttle lever member material located around entrances to the recesses to cover each magnet, wherein the throttle lever member material for staking is available in such an amount at the entrances to the recesses that the at least two magnets are completely covered by the throttle lever member material.

2. A method as claimed in claim 1, wherein the at least two magnets are separated by a rotational angle of about 90° from each other.

3. A method as claimed in claim 1, wherein the throttle lever member is made of a thermoplastic resin material.

4. A method as claimed in claim 1, wherein the staking involves application of heat or ultrasonic vibration to soften the throttle lever member material at the entrance.

5. A method as claimed in claim 4, wherein the staking melts the throttle lever member material at the entrance.

6. A magnet holder for use in an analogous or digital throttle position sensor for sensing the angle of a butterfly valve in a fuel supply unit of an internal combustion engine, said magnet holder including a throttle lever member adapted to be fixed to a shaft of the butterfly valve and carrying at least two magnets,
wherein the throttle lever member is made by injection molding and has three parallel tubular members interconnected by an integral transverse connection, two of the parallel tubular members being equidistantly spaced from a third one of the parallel tubular members and having bottoms and constituting two recesses, each recess being adapted to receive one of the two magnets, and wherein the third one of the parallel tubular members is larger than the other two parallel tubular members and is adapted to receive the shaft of the butterfly valve, and
wherein the at least two magnets are located in said recesses, and throttle lever member material located around entrances to the recesses is staked over the at least magnets, respectively, to cover each magnet sufficiently to retain each magnet in an associated recess, wherein the throttle lever member material for staking is available in such an amount at the entrances of the recesses that the at least two magnets are completely covered by the throttle lever member material.

7. A magnet holder as claimed in claim 6, wherein the at least two magnets are separated by a rotational angle of about 90° from each other.

8. A magnet holder as claimed in claim 6, wherein throttle lever member is made of a thermoplastic resin material.

9. A magnet holder as claimed in claim 6, wherein the staking involved is application of heat or ultrasonic vibration to soften the throttle lever member material around the entrance.

10. A magnet holder as claimed in claim 9, wherein the staking has melted the throttle lever member material around the entrance.

11. A method of manufacturing a magnet holder for an angular position sensor, comprising:
a) making a rotation member of the angular position sensor which rotation member is configured to be fixed to a shaft and adapted for rotation together with said shaft;
b) attaching at least one magnet to the rotation member; wherein
c) prior to step b), providing a recess in the rotation member for a magnet or for each magnet if more than one magnet is used;
d) then inserting the magnet into the recess or the magnets into the recesses if more than one magnet is used; and
e) securing the magnet or magnets by applying a heated tool to the material of the rotation member located around an entrance to the recess or around entrances to the recesses to cover each magnet to retain it in an associated recess, wherein the material is available in such an amount at the entrance to the recess or at the entrances to the recesses that the magnet or magnets are completely covered by the material, and wherein the tool has a tip portion which comprises a tip recess with respect to the surrounding surfaces of the tip portion, and step e) comprises pressing the tip portion against the material of the rotation member located around an entrance to the recess or entrances to the recesses.

12. A method as claimed in claim 11, wherein the tip recess has a conical shape.

13. A method as claimed in claim 11, wherein the tip portion has a temperature greater than the melting point of the material of the rotation member when applied to the material.

14. A magnet holder for use in an angular position sensor, said magnet holder including a rotation member adapted to be fixed to a shaft and configured to rotate therewith and configured to carry at least two magnets,
wherein the rotation member is made by injection molding and has three parallel tubular members interconnected by an integral transverse connection, two of the parallel tubular members being equidistantly spaced from a third one of the parallel tubular members and having bottoms and constituting two recesses, each recess adapted to receive one of the at least two magnets, and wherein the third one of the parallel tubular members is larger than the other two parallel members and adapted to receive the shaft of the butterfly valve, and
wherein the at least two magnets are located in said recesses, and rotation member material located around entrances to the recesses is staked over the at least two magnets, respectively, to cover each magnet to retain each magnet in an associated recess, wherein the rotation member material for staking is available in such an amount at the entrances to the recesses that the at least two magnets are completely covered by the rotation member material.

* * * * *